(12) United States Patent
Ushiyama et al.

(10) Patent No.: US 12,192,610 B2
(45) Date of Patent: Jan. 7, 2025

(54) IMAGING DEVICE WITH ILLUMINATION UNIT FEATURING LIGHT SHIELDING COMPONENT

(71) Applicant: KOWA COMPANY, LTD., Nagoya (JP)

(72) Inventors: Takao Ushiyama, Aichi (JP); Eiji Takahashi, Aichi (JP)

(73) Assignee: KOWA COMPANY, LTD., Nagoya (JP)

( * ) Notice: Subject to any disclaimer, the term of this patent is extended or adjusted under 35 U.S.C. 154(b) by 64 days.

(21) Appl. No.: 18/007,618

(22) PCT Filed: Jun. 2, 2021

(86) PCT No.: PCT/JP2021/020932
§ 371 (c)(1),
(2) Date: Dec. 1, 2022

(87) PCT Pub. No.: WO2021/246430
PCT Pub. Date: Dec. 9, 2021

(65) Prior Publication Data
US 2023/0353854 A1 Nov. 2, 2023

(30) Foreign Application Priority Data
Jun. 3, 2020 (JP) .................. 2020-096600

(51) Int. Cl.
*H04N 23/56* (2023.01)
*G02B 3/00* (2006.01)
(Continued)

(52) U.S. Cl.
CPC .......... *H04N 23/56* (2023.01); *G02B 3/0075* (2013.01); *G02B 13/0015* (2013.01);
(Continued)

(58) Field of Classification Search
CPC ...... H04N 23/56; H04N 23/55; H04N 13/239; H04N 13/254; G02B 3/0075;
(Continued)

(56) References Cited

U.S. PATENT DOCUMENTS

| 4,439,024 A | 3/1984 | Ito |
| 4,873,653 A | 10/1989 | Grosskopf |

(Continued)

FOREIGN PATENT DOCUMENTS

| EP | 1079255 A2 | 2/2001 |
| JP | 2003-186090 A | 7/2003 |

(Continued)

OTHER PUBLICATIONS

International Search Report dated Aug. 31, 2021, issued in counterpart International Application No. PCT/JP2021/020932. (2 pages).
(Continued)

*Primary Examiner* — Christopher K Peterson
(74) *Attorney, Agent, or Firm* — WHDA, LLP

(57) ABSTRACT

An imaging device according to the present invention includes an illumination unit 20 containing a light source 21 for emitting illumination light 2, and a lens group 22 for irradiating an imaging object 1 with the illumination light 2 emitted from the light source 21, and an imaging unit 10 for imaging the imaging object 1. A part of the illumination light 2 is shielded by a light shielding component 40.

8 Claims, 8 Drawing Sheets

(51) Int. Cl.
*G02B 13/00* (2006.01)
*G02B 19/00* (2006.01)
*G03B 17/12* (2021.01)
*H04N 23/55* (2023.01)

(52) U.S. Cl.
CPC ......... *G02B 19/0047* (2013.01); *G03B 17/12* (2013.01); *H04N 23/55* (2023.01)

(58) Field of Classification Search
CPC ............ G02B 13/0015; G02B 19/0047; G02B 21/0016; G02B 21/082; G02B 21/22; G02B 19/0009; G02B 19/0061; G02B 27/0988; G03B 17/12; G03B 2215/0589; G03B 11/045; G03B 15/05
See application file for complete search history.

(56) References Cited

U.S. PATENT DOCUMENTS

| | | |
|---|---|---|
| 2004/0125459 A1 | 7/2004 | Tanitsu et al. |
| 2008/0030707 A1* | 2/2008 | Tanaka ................ G03F 7/70108 362/277 |
| 2010/0171809 A1 | 7/2010 | Fujiyoshi |
| 2018/0073865 A1* | 3/2018 | Suzuki ............... G02B 21/0088 |
| 2019/0271800 A1 | 9/2019 | Kimura |

FOREIGN PATENT DOCUMENTS

| | | | |
|---|---|---|---|
| JP | 2003186090 | * 7/2003 | ............. G03B 15/05 |
| JP | 2010-134374 A | 6/2010 | |
| JP | 2018-157488 A | 10/2018 | |

OTHER PUBLICATIONS

Extended Supplementary European Search Report dated Aug. 7, 2024, issued in counterpart Application No. 21817058.7. (12 pages).

Partial (Supplementary) European Search Report dated May 17, 2024, issued in counterpart EP application No. 21817058.7. (12 pages).

* cited by examiner

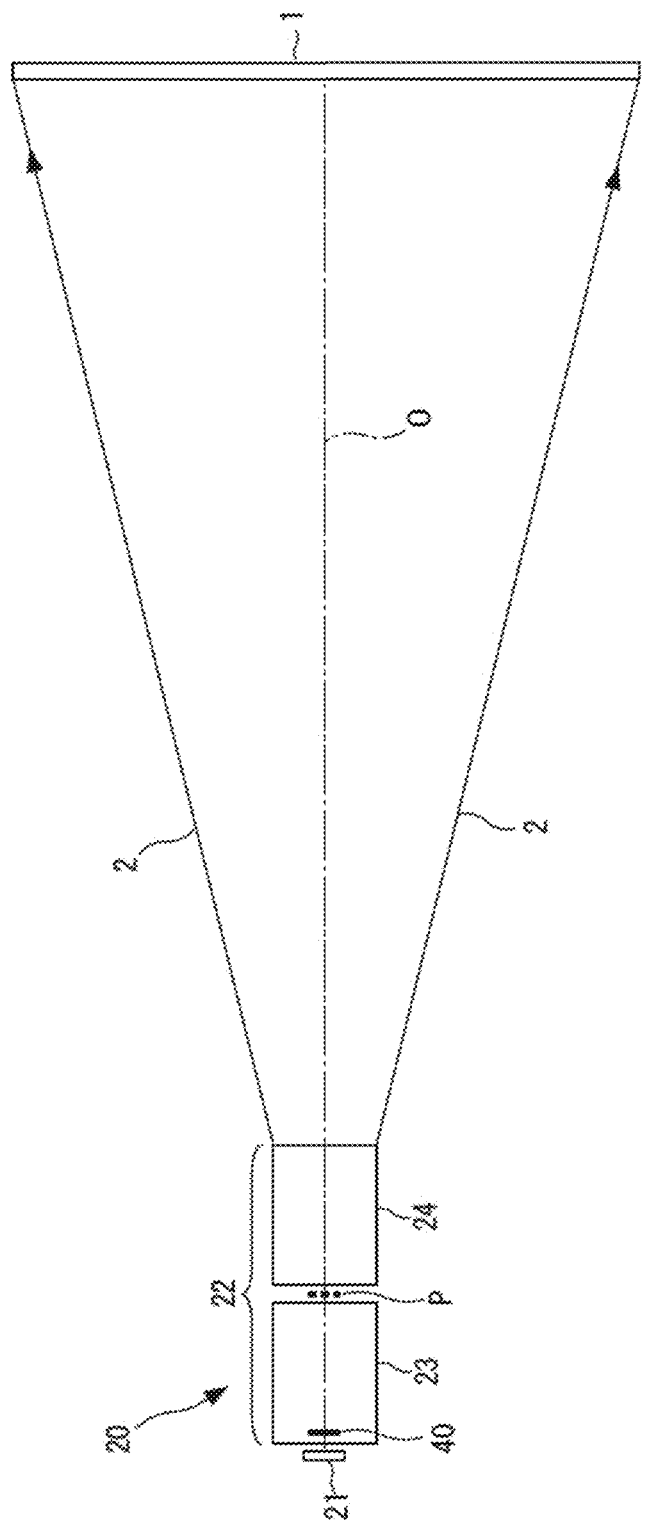

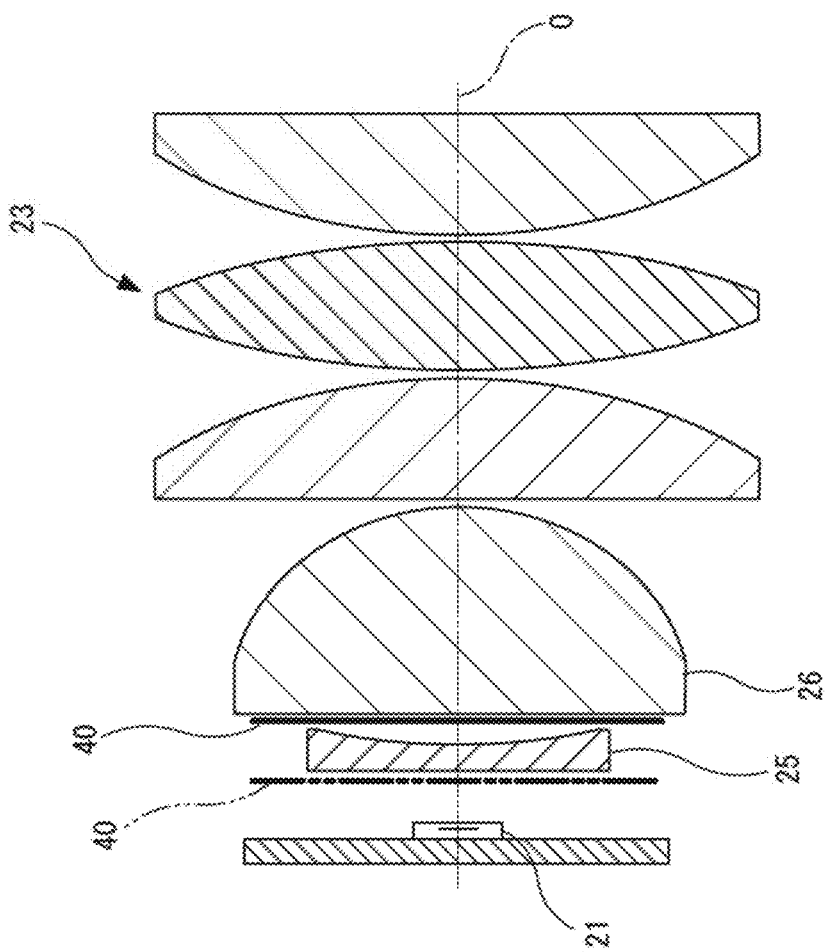

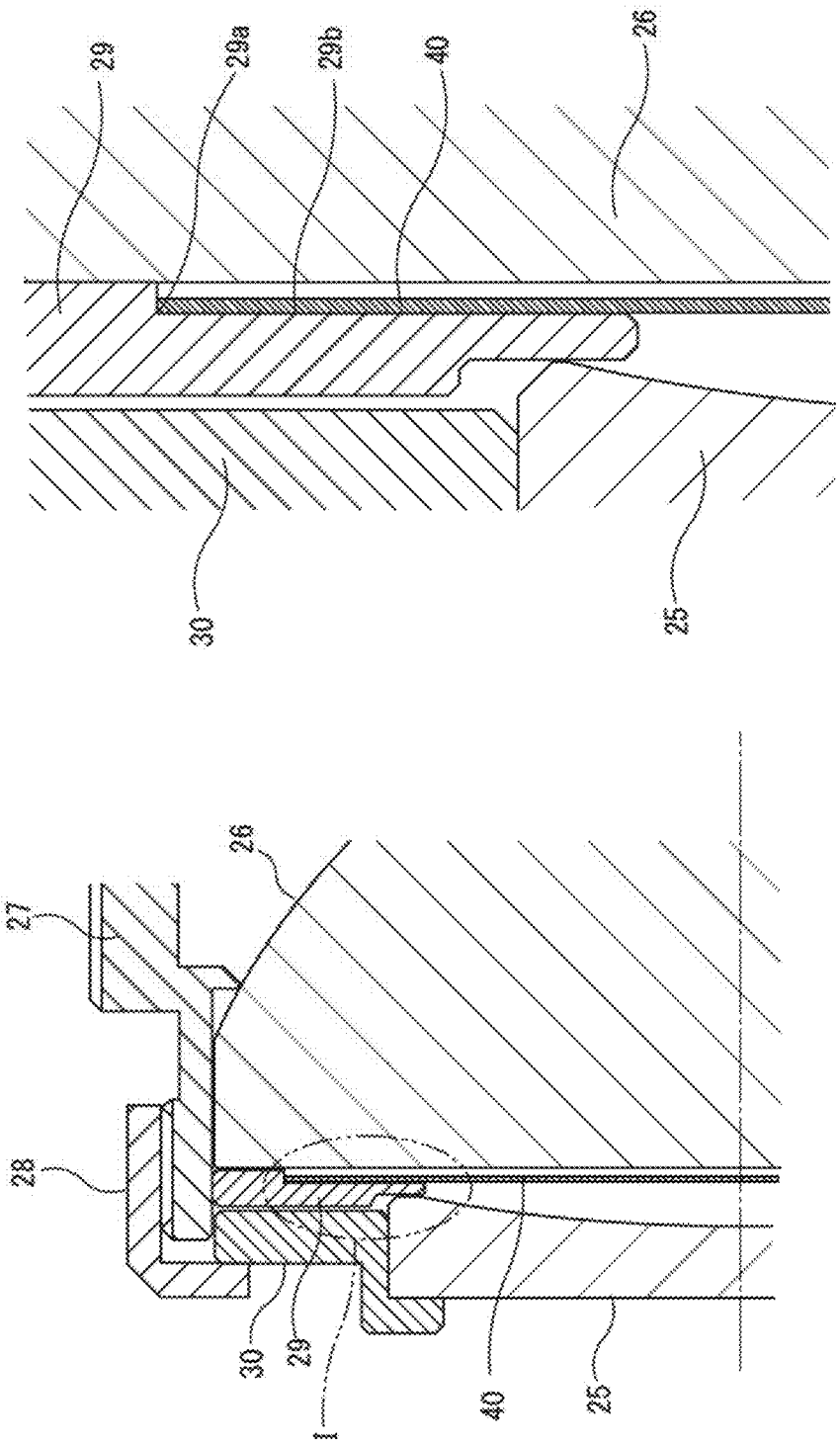

IMAGING DEVICE WITH ILLUMINATION UNIT FEATURING LIGHT SHIELDING COMPONENT

TECHNICAL FIELD

The present invention relates to an imaging device such as a stereo camera or the like that images an imaging object while irradiating the imaging object with light.

BACKGROUND ART

Various imaging devices including stereo cameras are used in various industries. For example, a stereo camera for recognizing the shape of a workpiece, the distance to the workpiece, and the like is sometimes installed in an industrial robot which operates on an automatic production line in a factory.

Many imaging devices including stereo cameras of this type are equipped with a illumination unit for compensating for insufficient exposure of an imaging object or the like.

In general, an illumination unit incorporated in an imaging device is set to substantially uniformly illuminate an imaging object. However, when a captured image is observed, there occurs sometimes a difference in brightness between a central portion and a peripheral portion of an imaging region. Specifically, the central portion of the captured image is often bright whereas the peripheral portion is dark.

If this type of difference in brightness occurs in a captured image, it may cause deterioration in accuracy of image analysis using that image, and thus countermeasures have been desired.

FIG. 3 of Patent Literature 1 discloses an illumination device (4) having a configuration in which a first light emitting unit (43b) is provided at a central portion of a light source (41) and further second light emitting units (44b, 45b) are provided around the first light emitting unit (43b). Reference numerals in parentheses are those given in Patent Literature 1.

In this illumination device (4), the brightness of the first light emitting unit (43b) at the central portion is set to be the lowest, and the brightness of the second light emitting units (44b, 45b) is set to increase sequentially to the outside. This configuration implements a light source (41) whose brightness gradually increases from the central portion to the peripheral portion of the light emitting units, whereby the uniformity of the illumination distribution on a projection plane (7) is enhanced.

However, since the illumination device (4) disclosed in Patent Literature 1 has an improved internal structure of the light source (41), it is necessary to produce the light source as a dedicated product, so that it has a drawback that the product cost thereof is higher than that of conventional devices each using a general-purpose LED or the like as a light source.

CITATION LIST

Patent Literature

Patent Literature: Japanese Patent Laid-Open No. 2018-157488

SUMMARY OF THE INVENTION

Technical Problem

The present invention has been made in view of such circumstances, and has an object to provide an imaging device that can obtain a captured image with uniform brightness and suppress an increase in product cost caused by improvements.

Solution to Problem

In order to attain the above object, the present invention relates to an imaging device comprising: an illumination unit including a light source for emitting illumination light, and a lens group for irradiating an imaging object with the illumination light emitted from the light source; and an imaging unit for imaging the imaging object, wherein the illumination unit is provided with a light shielding component for shielding against a part of the illumination light emitted from the light source.

By shielding against a part of the illumination light in this way, it is possible to correct the difference in brightness between the center and the periphery of a captured image, and equalize the brightness over an entire imaging region.

Moreover, since the imaging device of the present invention can be manufactured by adding a light shielding component to existing components, it is possible to suppress an increase in product cost associated with an improvement as compared with the invention of Patent Literature 1 in which an expensive light source is improved and dedicated.

The light shielding component may be configured so that a recording layer including a light shielding pattern is laminated on a thin-plate-like transparent substrate. By configuring the light shielding component in this way, the light shielding component can be manufactured at a low price, and it is possible to easily arrange it on the optical path of the illumination light emitted from the light source without occupying a large width.

The light shielding pattern may be configured to include, for example, a central light shielding portion for shielding a central portion of a cross-section perpendicular to an optical axis of the illumination light emitted from the light source against the illumination light, and an annular intermediate light shielding portion for shielding an intermediate portion between the optical axis and an outer edge of the cross-section perpendicular to the optical axis of the illumination light against the illumination light.

As described above, a captured image is often bright at the central portion thereof, and dark at the peripheral portion thereof. Therefore, the central portion of the cross-section perpendicular to the optical axis is shielded against the illumination light to reduce the brightness of a central portion in an irradiation region to the imaging object, whereby the captured image is also reduced in brightness at a central portion of an imaging region, so that the brightness of the central portion can be made close to that of a peripheral portion and the brightness of the entire imaging region can be equalized.

Furthermore, the intermediate portion between the optical axis and the outer edge of the cross-section perpendicular to the optical axis of the illumination light is shielded against the illumination light, whereby the brightness can be reduced stepwise from the central portion to the intermediate portion and further to the outer peripheral portion, so that the brightness can be smoothly equalized in the entire imaging region.

Further, the light shielding pattern, for example, may be formed by a set of a large number of light shielding dots, and the large number of light shielding dots may be arranged so as to be highest in density at a central portion of a cross-section perpendicular to an optical axis of the illumination light emitted from the light source for the illumination light, and decrease in density as a distance from the central portion in a radial direction increases for the illumination light.

By shielding against the illumination light with such a light shielding pattern, the brightness can also be gradually reduced from the central portion to the intermediate portion and further to the outer peripheral portion, so that the brightness over the entire imaging region can be more smoothly equalized.

Further, it is preferable that in the imaging device, wherein the illumination unit includes, in the lens group, a condenser lens for converging the illumination light from the light source, and an illumination system lens for irradiating the imaging object with the illumination light transmitted through the condenser lens, the light shielding component is arranged at a position that is not in an optically conjugated relation with the imaging object on an optical path of the illumination light emitted from the light source.

As a result, an image of the light shielding pattern is not formed on the imaging object, and the brightness in the entire imaging region can be smoothly equalized.

Specifically, it is preferable that in the imaging device, wherein a position which is optically conjugated with the imaging object is set in an intermediate portion between the condenser lens and the illumination system lens, and the condenser lens includes a plurality of lenses, the light shielding component is arranged between the plurality of lenses constituting the condenser lens in no contact with the surfaces of the plurality of lenses.

More specifically, it is preferable that the light shielding component is arranged between a first lens closest to the light source and a second lens adjacent to the first lens in the plurality of lenses constituting the condenser lens. By arranging the light shielding component at such a position, the light shielding component can be spaced greatly apart from a position that is optically conjugated with the imaging object, and the light shielding pattern can be projected onto the imaging object in a greatly blurred state, so that the brightness in the entire imaging region can be equalized more smoothly.

Further, a spacer which forms a gap between the first lens and the second lens may be provided, and the light shielding component may be configured to be attached to the spacer to be incorporated in the condenser lens. The spacer enables the light shielding component to be arranged in no contact with the surfaces of the lenses.

In the imaging device, wherein a position which is optically conjugated with the imaging object may be set in an intermediate portion between the condenser lens and the illumination system lens, the light shielding component may be arranged between the light source and the condenser lens.

As described above, according to the present invention, it is possible to obtain a captured image having uniform brightness, and also it is possible to suppress an increase in product cost caused by an improvement.

BRIEF DESCRIPTION OF DRAWINGS

FIG. 4 is a diagram showing an arrangement position of the light shielding component in an illumination unit.

FIG. 5 is a cross-sectional view showing a specific arrangement position of the light shielding component in a condenser lens.

FIG. 6A is a cross-sectional view showing an incorporation structure in which the light shielding component is incorporated into the condenser lens, and FIG. 6B is a cross-sectional view showing an enlarged I portion.

REFERENCE SIGNS LIST

1: imaging object, 2: illumination light,
10: imaging unit, 11: imaging element, 12: imaging system lens, 20: illumination unit, 21: light source, 22: lens group, 23: condenser lens, 24: illumination system lens, 25: first lens, 26: second lens, 27: lens barrel, 28: restraining component, 29: annular spacer, 29*a*: stepped portion, 29*b*: adhesive surface, 30: support component, P: conjugate position,
40: light shielding component, 41: light shielding pattern, 41*a*: central light shielding portion, 41*b*: intermediate light shielding portion, 41*c*: light shielding dot, 42: transparent substrate, 43: recording layer

BEST MODE FOR CARRYING OUT THE INVENTION

Hereinafter, an embodiment of the present invention will be described in detail with reference to the drawings.

Figure 1:
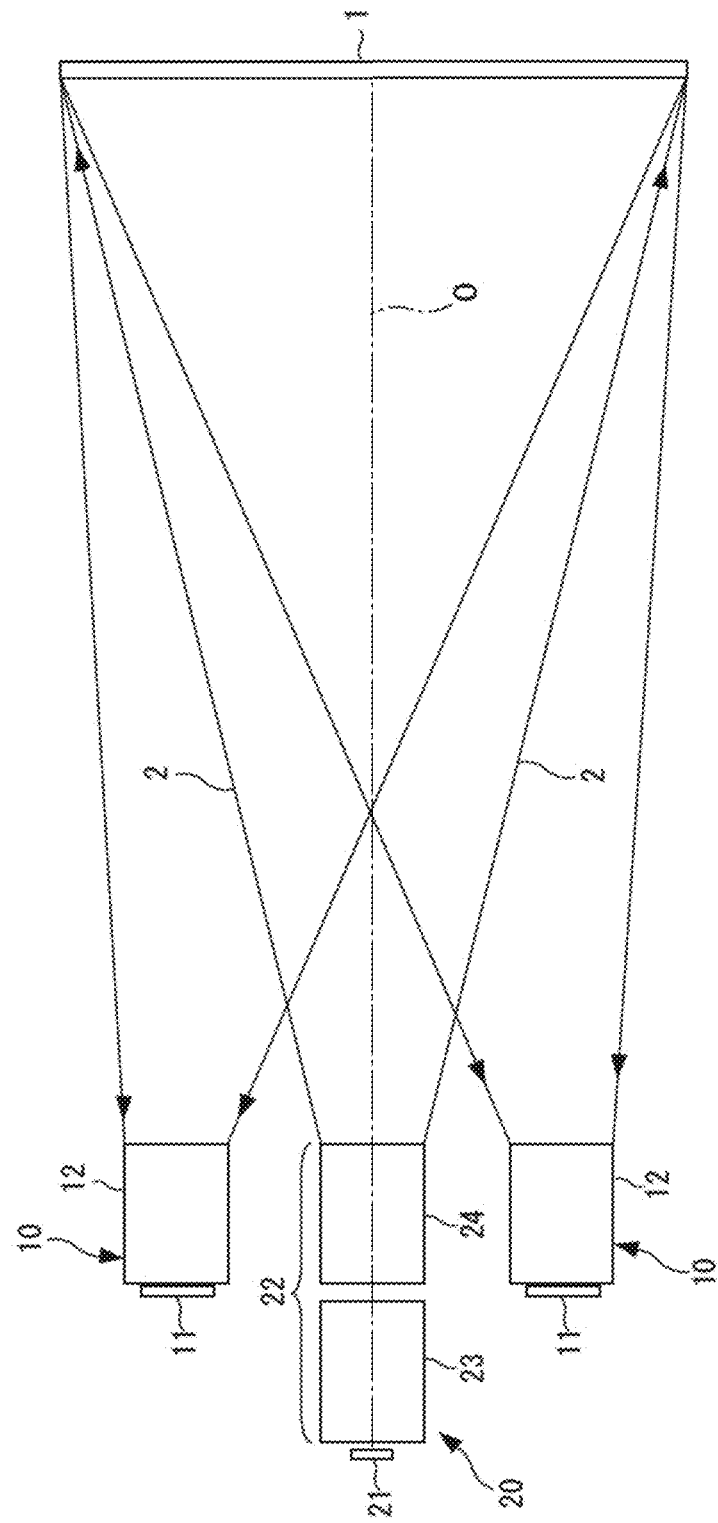
FIG. 1 is a schematic configuration diagram showing an overall structure of an imaging device according to an embodiment of the present invention.

FIG. 1 is a schematic configuration diagram showing an overall structure of an imaging device according to an embodiment of the present invention.

This embodiment shows a configuration example in which the present invention is applied to a stereo camera as an imaging device. As is well known, a stereo camera is a device that images an imaging object 1 with two imaging units 10 (cameras) and performs image processing on captured image data, whereby it is possible to obtain three-dimensional image data including data in a depth direction.

The imaging unit 10 is configured, for example, by a combination of an imaging element 11 and an imaging system lens 12 for receiving reflected light from the imaging object 1 and guiding the reflected light to the imaging element 11. For example, CCD (Charge Coupled Device) or CMOS (Complementary Metal Oxide Semiconductor) is applied as the imaging element 11. The two imaging units 10 are arranged to be spaced from each other at a constant distance in a width direction.

In addition to the configuration described above, various types of cameras to be used for known stereo cameras can be applied as the imaging unit 10.

An illumination unit 20 is arranged at a central position in the width direction which is sandwiched between the two imaging units 10. The illumination unit 20 has a function of irradiating the imaging object 1 with illumination light 2 in order to compensate for insufficient exposure of the imaging object 1 and the like. The illumination unit 20 is configured to include a light source 21 for emitting illumination light 2, and a lens group 22 for irradiating the imaging object 1 with the illumination light 2 emitted from the light source 21.

For example, a light emitting diode (LED) or an organic electroluminescence (EL) element can be applied as the light source 21.

The lens group 22 includes a condenser lens 23 for converging the illumination light 2 from the light source 21, and an illumination system lens 24 for irradiating the imaging object 1 with the illumination light 2 transmitted through the condenser lens 23.

In the present embodiment, the illumination unit 20 is arranged at the central position sandwiched between the two imaging units 10, and irradiates the imaging object 1 with the illumination light 2 from a position facing the imaging object 1.

These units are respectively incorporated in a main body case (not shown) to constitute one imaging device, and arranged at arbitrary positions facing the imaging object 1 which is attached to an industrial robot arm or the like.

The illumination unit 20 is set so as to illuminate the imaging object 1 substantially uniformly. However, in practice, a large difference in brightness sometimes occurs between a central portion and a peripheral portion of a captured image. Specifically, the central portion of the captured image is often bright whereas the peripheral portion is dark.

This is guessed to be because the amount of light on the periphery is insufficient as compared to the amount of light at the center that reaches the imaging element 11 due to differences in the reflection characteristics of the imaging object 1 and the performance of the center/periphery light amount ratio of the imaging system lens 12 (that is, lens performance).

Figure 2:
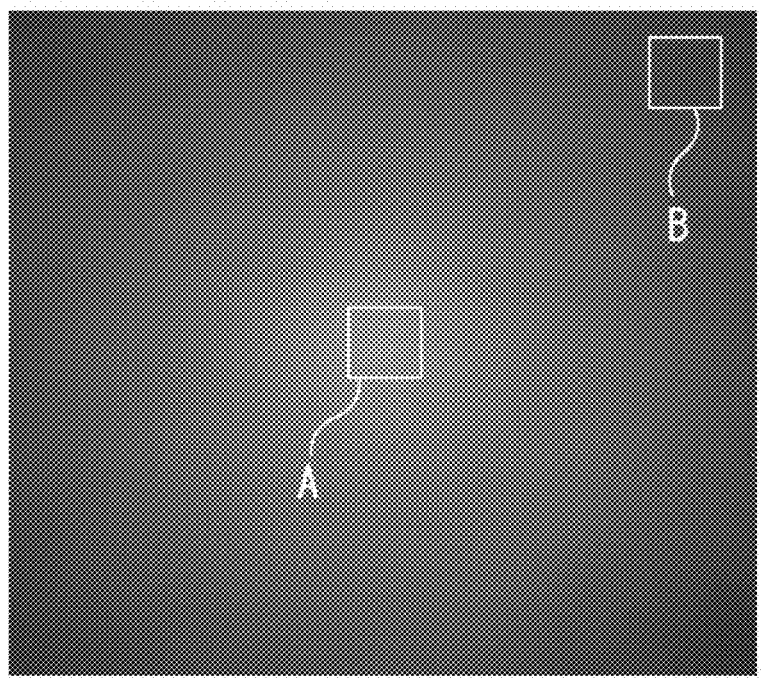
FIG. 2 is a diagram showing a captured image obtained by an experiment of the present inventors.

FIG. 2 is a diagram showing a captured image obtained by an inventors' experiment. The captured image is a captured image obtained by using the imaging unit 10 and, as an imaging object 1, an alumite flat plate whose surface has been processed into a white satin-finished light-scattering surface, arranging the illumination unit 20 at a position facing the imaging object 1, and irradiating the imaging object 1 with illumination light 2 to image the surface of the imaging object 1. In order to clarify the difference in brightness among locations, image processing has been performed to darken the whole of the imaging object 1. In this captured image, the brightness of a central portion A of an imaging region was equal to 138 in relative value, whereas the brightness of the peripheral portion B was similarly equal to 54 in relative value, so that the ratio in brightness of the peripheral portion/central portion was equal to 39%. Therefore, a phenomenon in which the central portion was bright and the peripheral portion was dark was observed.

Therefore, the imaging device of the present embodiment is configured so that a light shielding component 40 is incorporated in the illumination unit 20 to shield against a part of the illumination light 2, thereby correcting the difference in brightness between the center and the periphery of the captured image and equalizing the brightness over the whole imaging region.

Figure 3A:
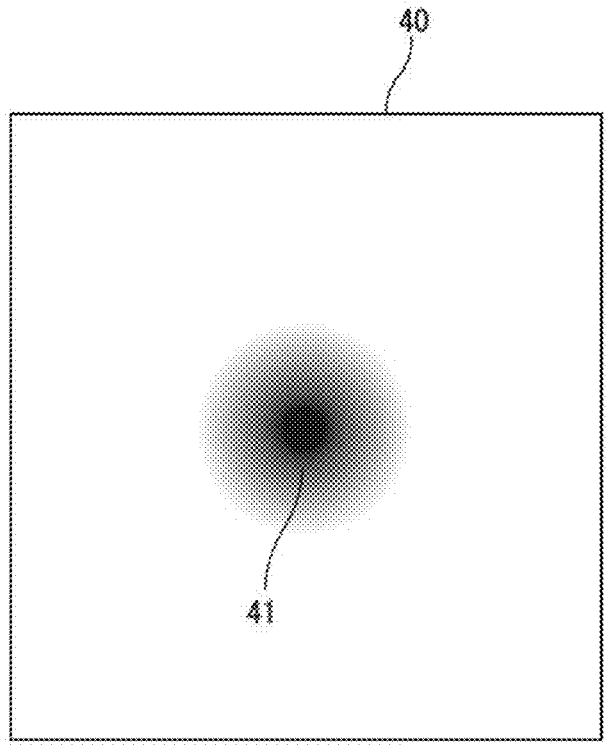
FIG. 3A is a front view showing an example of a light shielding component.
Figure 3B:
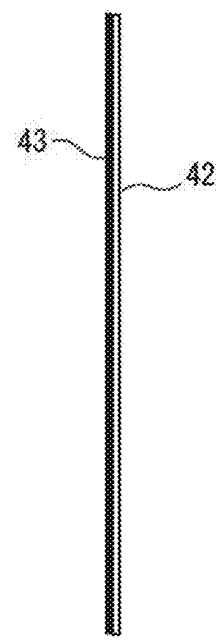
FIG. 3B is a right side view of the same.

FIG. 3A is a front view showing an example of the light shielding component, and FIG. 3B is a right side view of the same.

A light shielding pattern 41 that shields the illumination light 2 from the light source 21 is formed on the light shielding component 40.

The light shielding component 40 can be configured so that a recording layer 43 of the light shielding pattern 41 is laminated on a transparent substrate 42 having a thin-plate-like shape, for example. The recording layer 43 can be formed to be coated with a photosensitive emulsion. The light shielding component 40 having such a configuration can be manufactured from a commercially available positive film. The light shielding pattern 41 is printed on the recording layer 43 by light exposure, and subjected to developing processing, whereby it can be drawn as an image.

The light shielding component 40 having such a configuration can be manufactured at low cost, and the light shielding pattern 41 drawn on the recording layer 43 can be easily changed as required. This allows flexible design changes according to the reflection characteristics of the imaging object 1 or the like.

Note that the light shielding component 40 is not limited to a configuration using a positive film. For example, it may be configured so that a recording layer 43 made of a chromium thin film is laminated on a thin-plate-like transparent glass substrate. The glass substrate has advantages that it is difficult to thermally expand and has high heat resistance.

In addition, by forming the light shielding component 40 in the shape of a thin plate, it can be easily arranged on the optical path of the illumination light 2 emitted from the light source 21 without requiring a large width, as will be described below.

FIG. 4 is a diagram showing an arrangement position of the light shielding component in the illumination unit.

With respect to the illumination unit 20 including an optical system for converging the illumination light 2 from the light source 21 with the condenser lens 23 and irradiating the imaging object 1 through the illumination system lens 24, a position (conjugate position P) which is optically conjugate with the imaging object 1 is set between the condenser lens 23 and the illumination system lens 24. When a projection object is arranged at this conjugate position P, an image of the projection object is formed on the surface (projection surface) of the imaging object 1. Therefore, when the light shielding component 40 is arranged at this conjugate position P, an image of the light shielding pattern 41 is clearly formed on the surface of the imaging object 1, so that the brightness may vary discontinuously at the boundaries between the image-formation location of the light shielding pattern 41 and other locations.

Therefore, in the present embodiment, the light shielding component 40 is arranged at a position (other than the conjugate position P) that is not in an optically conjugate relationship with the imaging object 1. For example, as shown in FIG. 4, a configuration in which the light shielding component 40 is incorporated inside the condenser lens 23 can be employed.

As shown in FIG. 5, the condenser lens 23 is configured by a plurality of lenses. If the light shielding component 40 is arranged between a first lens 25 closest to the light source 21 and a second lens 26 adjacent to the first lens out of these lenses, the light shielding component 40 can be arranged to be apart from the conjugate position P by a large distance. As the distance from the conjugate position P increases, the light shielding pattern 41 projected on the surface of the imaging object 1 is more greatly blurred. Therefore, the boundary where the brightness is discontinuous is made inconspicuous, whereby the imaging object 1 can be illuminated with the illumination light 2 whose brightness changes smoothly.

Here, it is preferable that the light shielding component 40 is arranged in no contact with the surface of each lens. This is because when the light shielding component 40 comes into contact with the surface of a lens, interference fringes may appear, which causes variations in the brightness of the illumination light 2, and thus the above arrangement of the light shielding component 40 prevents the variations in the brightness of the illumination light 2.

Note that the light shielding component 40 can also be arranged between the first lens 25 (that is, the condenser lens 23) and the light source 21 as indicated by an imaginary line in FIG. 5. By arranging the light shielding component 40 at this position, it is possible to more greatly blur the light shielding pattern 41 projected onto the surface of the imaging object 1.

FIGS. 6A and 6B are cross-sectional views showing the incorporation structure in which the light shielding component is incorporated into the condenser lens.

As shown in FIG. 6A, the plurality of lenses constituting the condenser lens 23 are inserted and arranged in the cylindrical lens barrel 27, and clamped in an axial direction by a restraining component 28 to be fixed without rattling. An annular spacer 29 for spacing adjustment is provided between the first lens 25 and the second lens 26, and the light shielding component 40 is attached to this annular spacer 29. Note that the first lens 25 is incorporated via a support component 30.

As shown in enlarged view in FIG. 6B, a stepped portion 29a is formed in the annular spacer 29, and an adhesive surface 29b of the light shielding component 40 is formed at a position where it is more recessed than the peripheral surface thereof in contact with the second lens 26. By adhesively fixing the light shielding component 40 to the adhesive surface 29b, the light shielding component 40 can also be arranged in no contact with the surface of the second lens 26 (of course, in no contact with the surface of the first lens 25).

Figure 7:
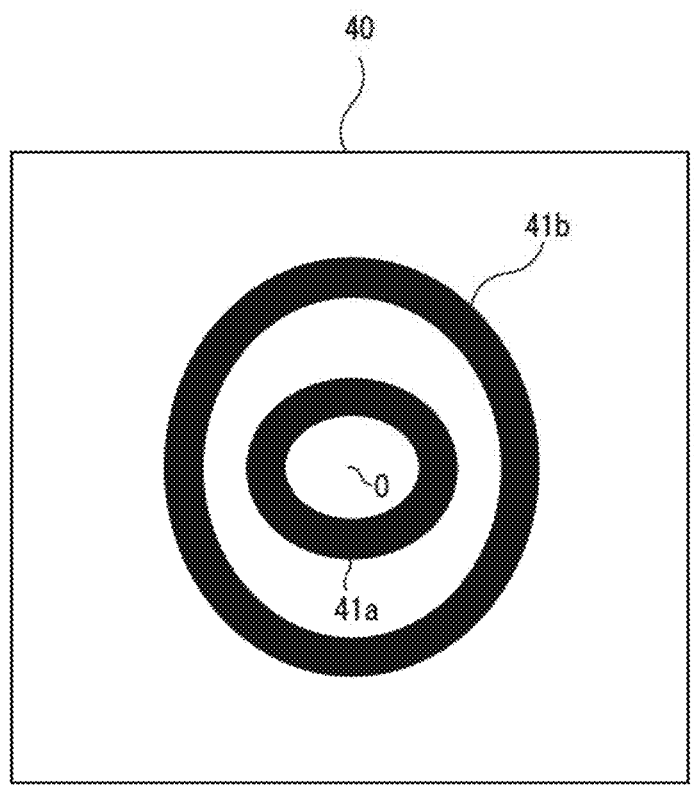
FIG. 7 is a front view showing a configuration example of a light shielding pattern formed on the light shielding component.

FIG. 7 is a front view showing a configuration example of the light shielding pattern formed on the light shielding component.

A virtual cross-section perpendicular to the optical axis O of the illumination light 2 emitted from the light source 21 is assumed, and the light shielding pattern 41 shown in FIG. 7 is configured to include a central light shielding portion 41a for shielding against a central portion of the illumination light 2 on the virtual cross-section and an annular intermediate light shielding portion 41b for shielding against an intermediate portion of the illumination light between the optical axis O and the outer edge of the virtual cross-section.

The central light shielding portion 41a and the intermediate light shielding portion 41b are each formed in an elliptical ring shape, and it is preferable that the thickness and diameter are simulated according to each of the shape of the light emitting surface of the light source and the imaging object 1 and set accordingly. By forming them in the elliptical ring shapes, the illumination light 2 can be projected onto the imaging object 1 while the outline of the illumination light 2 can be blurred by the wraparound of light with the illumination light 2 being dimmed. Therefore, the boundary where the brightness is discontinuous is made inconspicuous, so that the imaging object 1 can be illuminated with the illumination light 2 whose brightness changes smoothly.

Figure 8:
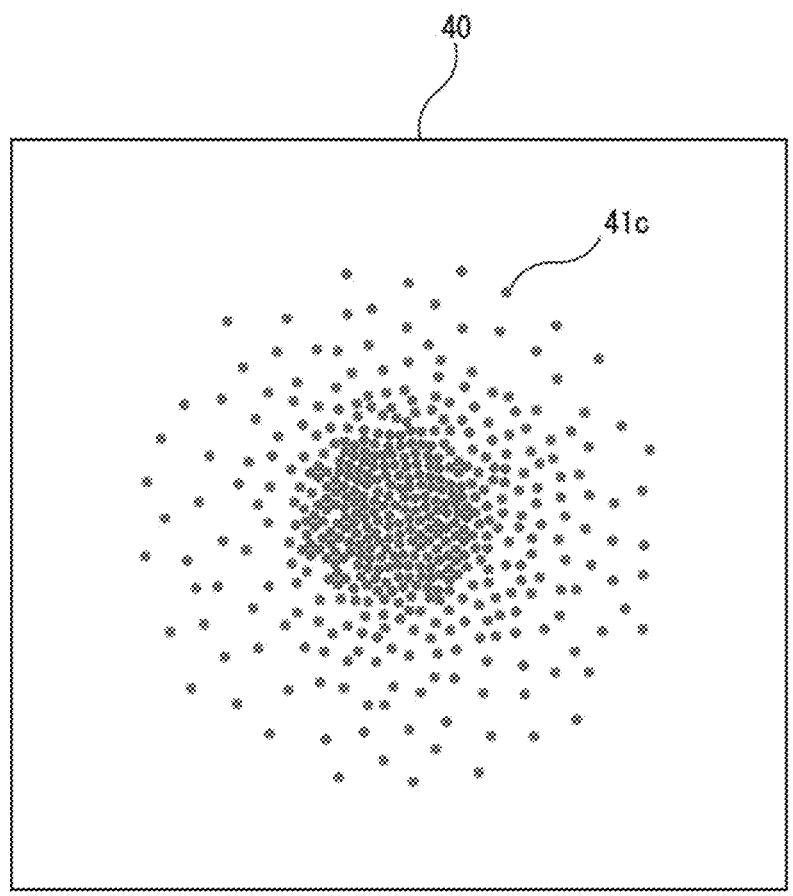
FIG. 8 is a front view showing another configuration example of the light shielding pattern formed on the light shielding component.

FIG. 8 is a front view showing another configuration example of the light shielding pattern formed on the light shielding component.

The light shielding pattern 41 shown in FIG. 8 is formed by a set of a large number of light shielding dots 41c. A virtual cross-section perpendicular to the optical axis O of the illumination light 2 emitted from the light source 21 is assumed, and the large number of light shielding dots 41c are arranged so as to be highest in density for a central portion of the illumination light 2 and decrease in density as the distance from the central portion in a radial direction increases on the virtual cross-section.

By shielding the illumination light 2 with such a light shielding pattern 41, it is possible to gradually reduce the brightness from the central portion to the intermediate portion and further to the outer peripheral portion.

The present invention is not limited to the above-described embodiment, and it goes without saying that various modifications and applications are possible as required.

For example, the light shielding pattern 41 of the light shielding component 40 is configured to shield against the central portion of the illumination light 2. However, when a region other than a central portion of a captured image is brighter than the central portion of the captured image, it is preferable that the light shielding pattern 41 is configured so as to shield against a part of the illumination light 2 corresponding to the brighter region according to such an individual phenomenon.

The invention claimed is:
1. An imaging device comprising:
an illumination unit including a light source for emitting illumination light, and a lens group for irradiating an imaging object with the illumination light emitted from the light source; and
an imaging unit for imaging the imaging object, wherein the illumination unit is provided with a light shielding component for shielding against a part of the illumination light emitted from the light source;
wherein the illumination unit includes, in the lens group, a condenser lens for converging the illumination light from the light source, and an illumination system lens for irradiating the imaging object with the illumination light transmitted through the condenser lens; and
a position which is optically conjugated with the imaging object is set in an intermediate portion between the condenser lens and the illumination system lens, and the condenser lens includes a plurality of lenses; and
the light shielding component is arranged between the plurality of lenses constituting the condenser lens in no contact with the surfaces of the plurality of lenses.

2. The imaging device according to claim 1, wherein the light shielding component is configured so that a recording layer including a light shielding pattern is laminated on a thin-plate-like transparent substrate.

3. The imaging device according to claim 2, wherein the light shielding pattern includes a central light shielding portion for shielding a central portion of a cross-section perpendicular to an optical axis of the illumination light emitted from the light source against the illumination light, and an annular intermediate light shielding portion for shielding an intermediate portion between the optical axis and an outer edge of the cross-section perpendicular to the optical axis of the illumination light against the illumination light.

4. The imaging device according to claim 2, wherein the light shielding pattern is formed by a set of a large number of light shielding dots, and the large number of light shielding dots are arranged so as to be highest in density at a central portion of a cross-section perpendicular to an optical axis of the illumination light emitted from the light source for the illumination light, and decrease in density as a distance from the central portion in a radial direction increases for the illumination light.

5. The imaging device according to claim 1, wherein the light shielding component is arranged at a position that is not in an optically conjugated relation with the imaging object on an optical path of the illumination light emitted from the light source.

6. The imaging device according to claim 1, wherein the light shielding component is arranged between a first lens closest to the light source and a second lens adjacent to the first lens in the plurality of lenses constituting the condenser lens.

7. The imaging device according to claim 6, wherein a spacer which forms a gap between the first lens and the second lens is provided, and the light shielding component is attached to the spacer to be incorporated in the condenser lens.

8. An imaging device comprising:
an illumination unit including a light source for emitting illumination light, and a lens group for irradiating an imaging object with the illumination light emitted from the light source; and
two imaging units for imaging the imaging object, wherein the illumination unit is provided with a light shielding component for shielding against a part of the illumination light emitted from the light source;
wherein the illumination unit is disposed between the two imaging units, the light shielding component includes a light shielding pattern, and the light shielding pattern includes a central light shielding portion for shielding a central portion of a cross-section perpendicular to an optical axis of the illumination light emitted from the light source against the illumination light.

* * * * *